United States Patent [19]
Counter et al.

[11] Patent Number: 5,215,185
[45] Date of Patent: Jun. 1, 1993

[54] BREAKABLE MOLDED PLASTIC LINKS FOR FORMING CONVEYOR CHAIN

[75] Inventors: Louis F. Counter, Greendale; Peter J. Ensch, Wauwatosa, both of Wis.

[73] Assignee: Rexnord Corporation, Milwaukee, Wis.

[21] Appl. No.: 941,661

[22] Filed: Sep. 8, 1992

[51] Int. Cl.⁵ .............................................. B65G 17/06
[52] U.S. Cl. ................................................... 198/853
[58] Field of Search ................ 198/852, 853, 851, 850

[56] References Cited

U.S. PATENT DOCUMENTS

| | | | |
|---|---|---|---|
| 4,709,807 | 12/1987 | Poerink | 198/853 |
| 4,742,907 | 5/1988 | Palmaer | 198/852 |
| 4,951,457 | 8/1990 | Deal | 198/850 |
| 4,972,942 | 11/1990 | Faulkner | 198/853 |
| 5,096,053 | 3/1992 | Hodlewsky | 198/853 |
| 5,125,504 | 6/1992 | Corlett et al. | 198/853 |
| 5,156,262 | 10/1992 | Horton | 198/853 |
| 5,156,264 | 10/1992 | Lapeyre | 198/852 |

*Primary Examiner*—Joseph E. Valenza
*Attorney, Agent, or Firm*—Michael, Best & Friedrich

[57] ABSTRACT

A conveyor chain is formed from a plurality of molded plastic chain links assembled in brick-laid fashion. The molded plastic chain links each include an intermediate structure connecting a first plurality of link ends to a second plurality of link ends, the intermediate structure including notches provided for facilitating breaking of the molded plastic chain link at selected locations along the length of the chain link and such that the molded plastic chain link is broken along a line extending in the direction of the chain pitch at each such selected location.

18 Claims, 3 Drawing Sheets

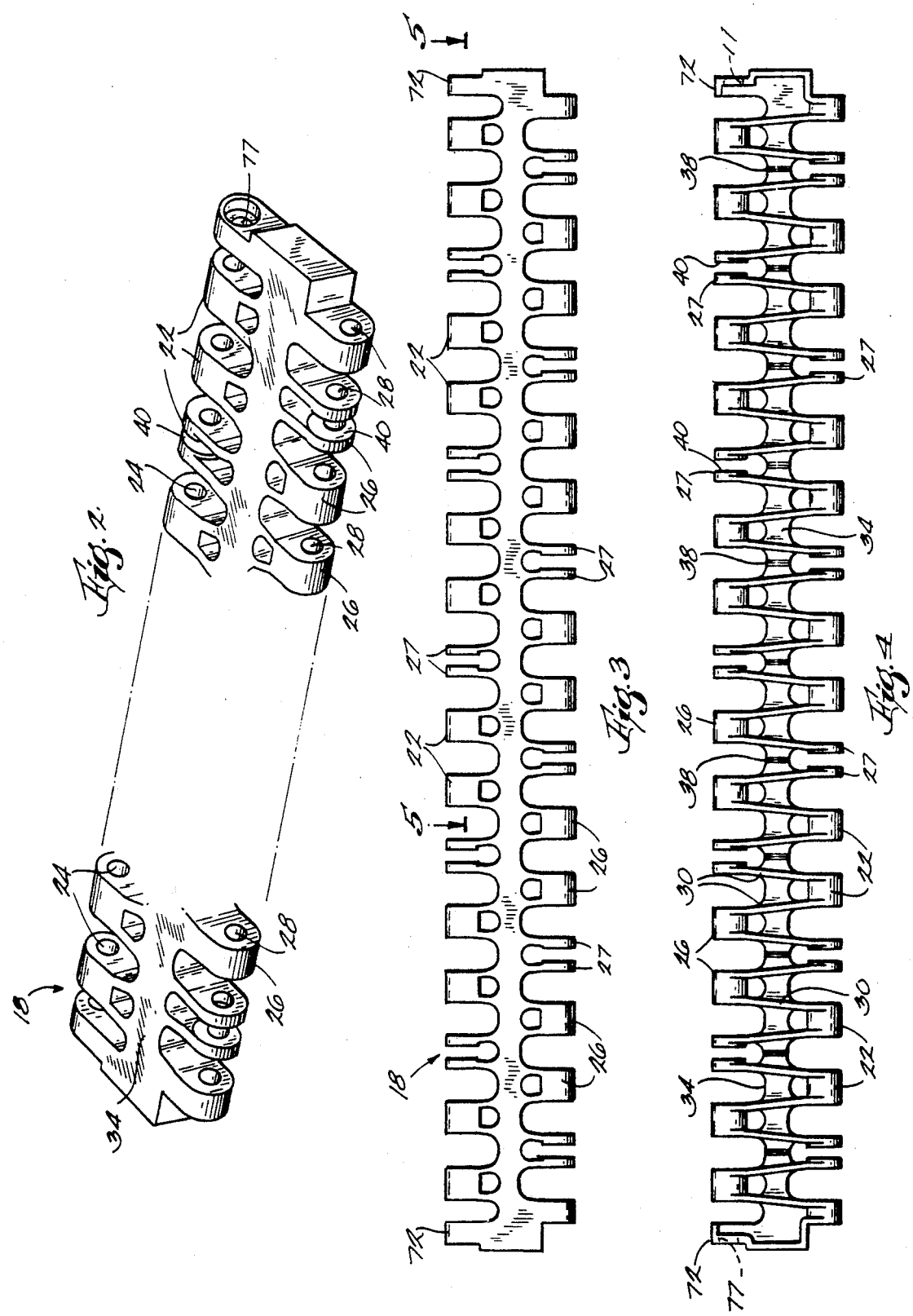

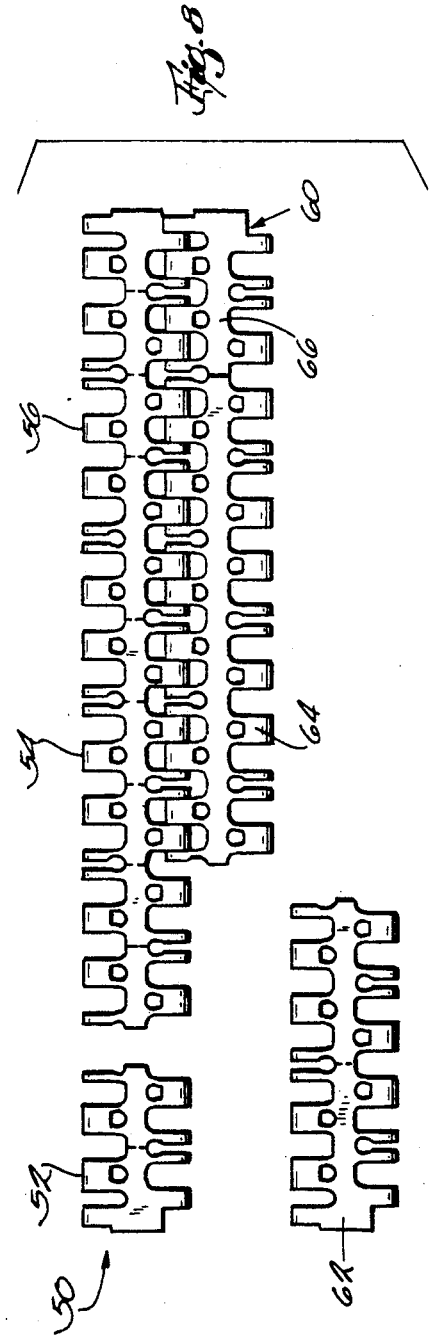
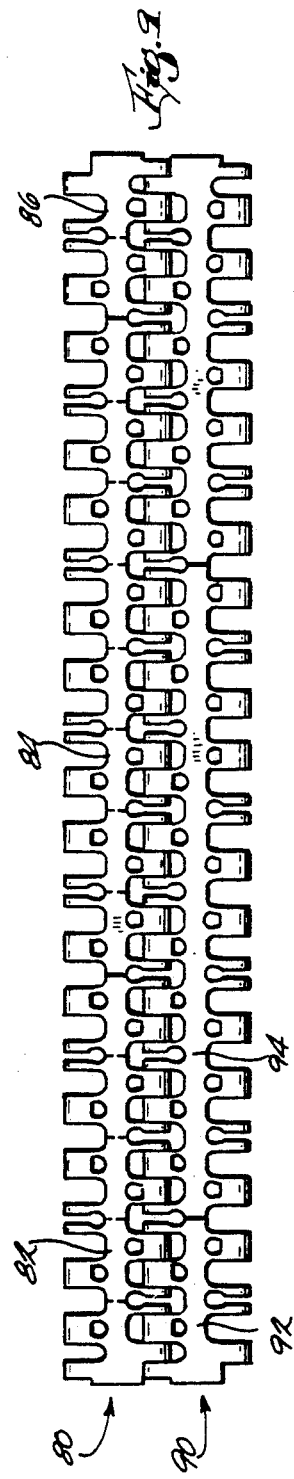
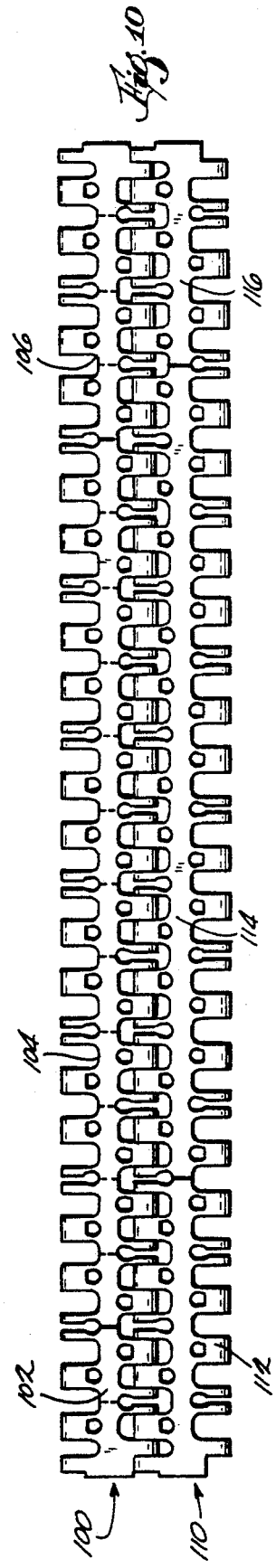

BREAKABLE MOLDED PLASTIC LINKS FOR FORMING CONVEYOR CHAIN

FIELD OF THE INVENTION

The invention relates to conveyor chains and to conveyor chains formed of multiple widths of molded plastic links.

BACKGROUND PRIOR ART

Conveyor chains and belts for use in material handling conveyors are commonly constructed from injection molded chain links assembled in side-by-side relation and joined together in rows by chain pins. Such chain links can be assembled to form chains of various widths depending on the number of chain links positioned together in side-by-side relation. Such chains and belts are constructed of molded chain links of at least two different widths to permit the chain links to be brick-laid. Bricklaying of the chain links results in increased strength of the chain in tension as well as increased transverse rigidity.

Such molded plastic conveyor chains are also used in conveyors originally designed to employ woven wire mesh conveyor belting. Such woven wire mesh belting, although limited in many respects, was commonly produced as a laced or woven material and could be conveniently produced or manufactured in any selected width. Because the woven wire mesh belting was available in any required width, conveyor manufacturers designed conveyor systems of varying widths and did not limit the conveyor designs to selected standard widths.

Plastic modular conveyor chains have replaced woven wire mesh conveyor belts because the plastic modular chains are light weight, corrosion resistant, easily cleaned and provide low friction properties without the use of lubricants. However, such modular conveyor chains are commonly molded in only specific sizes, such as modules which are 3-inches and 6-inches wide. In many applications for modular plastic chains such as in existing conveyor frames, the chains made of such molded plastic links can be made to accommodate the conveyor frame width only by cutting some or all of the molded chain links to form the required chain width. Although cutting of the modules to the required width produces a chain which will accommodate the conveyor frame, cutting of the chain module requires substantial time and labor in manufacture and assembly of the chain. Additionally, cutting of the modules results in waste of material. For example, if a 12-inch wide chain link is cut in half, this cutting process does not produce two modules each 6 inches in width. The cutting operation will produce one 6-inch module and a second module which is slightly less than 6 inches in width, that dimension being equal to the width of the saw blade or other cutting device. While it is possible to grind up the resulting waste plastic material of the shorter wasted portion of the chain link such that material can again be molded to form other modules, additional molding operations are expensive and time consuming.

Additionally, most chain modules are molded from materials such as acetal, polypropylene, polyester or polyethylene, and these materials burr significantly when machined or cut. These burrs must be removed to provide a tight fitting conveyor assembly which is flat and easy to clean. Removal of burrs is labor intensive and further adds to the expense of producing chain having a width which is other than a standard width.

SUMMARY OF THE INVENTION

The present invention provides a conveyor chain which is comprised of chain links which can form chains of various widths without the need for cutting the chain links. More specifically, the present invention provides molded plastic chain links which can be conveniently broken at selected locations along their width to produce chain links of various lengths and such that multiple chain links of selected width can be placed side-by-side to produce assembled chains of a width required by a conveyor and without waste of portions of the chain links.

More specifically the invention includes a conveyor chain including a plurality of molded plastic chain links assembled in brick-laid fashion, the molded plastic chain links having a first plurality of spaced apart link ends including aligned bores adapted to house a first chain pin, a second plurality of spaced apart link ends including aligned bores adapted to house a second chain pin and an intermediate structure connecting the first plurality of link ends to the second plurality of link ends. The intermediate structure includes means for facilitating breaking of the molded plastic chain link at selected locations along the length of the chain link and such that the molded plastic chain link is broken along a line extending in the direction of the chain pitch at each such selected location.

In one embodiment of the invention the means for facilitating breaking of the molded plastic chain link includes a plurality of spaced apart linear grooves formed in the intermediate structure and extending in the direction of the chain pitch, the grooves each providing a break point whereby the chain link may be broken along a line extending in the direction of the chain pitch.

In one embodiment of the invention the intermediate structure includes a plurality of reach bars extending generally in the direction of the chain pitch, the reach bars connecting the first link ends to the second link ends, and a top plate having an upper surface and a lower surface, and wherein the means for facilitating breaking of the molded plastic chain link includes grooves formed in the lower surface of the top plate and extending in the direction of the chain pitch.

In one embodiment of the invention the chain links each further include at least one link end in line with at least one of the grooves, that link end being bifurcated and including a parting line in the plane including that groove.

The chain modules of the invention provide a design which can minimize the number of plastic molds required for making the links and still provide a bricked chain construction while also providing a chain at a reduced manufacturing cost. Reductions in the cost of the chain arise because of reductions in material waste, reduction of remolding of cut waste, and elimination of cutting and deburring operations during assembly. Efficiencies are also provided because fewer molds are required since only two chain link widths are required. There is also reduced tooling maintenance since fewer molds are required and reduced inventory of parts since only a few different molded links are required to produce links of various widths.

Another advantage of the invention is that the modules or links can be molded in relatively long lengths thereby maximizing or increasing molding efficiency.

One of the features of the invention is that the location of the break points in the module and the direction of the break line minimizes the force required to break the chain link during the chain assembly process while also maximizing the tensile strength of the finished conveyor chain in the normal tensioned condition.

The construction of the module and location of the break points also provides for substantial permissible deflection of the chain link on both sides of the break point during operation of the conveyor chain. Breakage of the chain links at the break points during operation of the conveyor chain can be prevented by providing wear strips and chain support structure in the conveyor frame which will prevent substantial deflection of the modules and provide complete support for the chain.

In the event the chain links are broken along the break lines as a result of sudden impact caused by dropping a load on the conveyor chain, the conveyor chain will remain operable because the brick-laid construction of assembly of the chain links will prevent lateral separation of the chain links, and additionally, separation of the modules into multiple pieces will not result in a significant decrease in the tensile strength of the chain. Because the links are brick-laid in the assembled chain, the seams between the modules are not in line with one another and do not form a seam in the chain.

Various other features of the invention will be apparent from the following description of the preferred embodiment, the drawings and the claims.

BRIEF DESCRIPTION OF THE DRAWINGS

FIG. 2 is an enlarged perspective view of a molded chain link used in forming the conveyor chain illustrated in FIG. 1.

FIG. 3 is a top view of a the molded chain link illustrated in FIG. 2.

FIG. 4 is a bottom view of the molded chain link illustrated in FIG. 2.

FIG. 8 is a partial exploded plan view of bricked chain embodying the invention and 12" wide.

FIG. 9 is a plan view of a bricked chain embodying the invention and showing a 15" wide chain.

FIG. 10 is a view similar to FIG. 9 and showing an 18" wide chain.

DESCRIPTION OF THE PREFERRED EMBODIMENT

Figure 1:
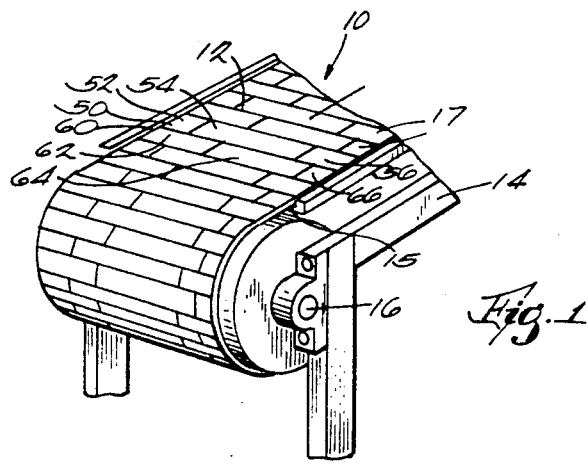
FIG. 1 is a perspective view of a conveyor including a modular conveyor chain embodying the invention.

FIG. 1 illustrates a conveyor 10 including a conveyor chain 12 embodying the invention, the conveyor 10 including a frame 14 supporting spaced apart wear strips 15 positioned beneath the conveyor chain 12 and supporting the conveyor chain. The conveyor also includes at least one sprocket (not shown) supported on a shaft 16 and driving the conveyor chain 12 in the direction of the arrow shown in FIG. 1. The conveyor chain 12 is comprised of a plurality of rows 17 of chain links or modules 18, the rows 17 being joined by chain pins 20 to form the chain. In the illustrated arrangement, each row of modules is comprised of a plurality of modules 18 positioned edge-to-edge with the modules of successive rows being brick-layed i.e. with the link ends of the modules in one row being intermeshed with link ends of two modules in the adjacent rows such that the modules 18 in one row 17 are not laterally movable with respect to the modules 18 in the adjacent rows 17.

Referring more specifically to the construction of the chain links, FIG. 2 illustrates a 12" molded plastic chain link 18 embodying the invention. The chain link 18 includes a first set of link ends or barrels 22 on one end of the chain link, the link ends 22 being spaced apart from one another along the width of the chain link and each of the link ends 22 including a hole 24, the holes 24 being aligned along a common axis so as to be adapted to house a chain pin 20. The chain link 18 further includes a second set of link ends or barrels 26 on the opposite end of the chain link, the second set of link ends 26 also each including holes 28 aligned so as to be adapted to house a second chain pin 20. The link ends 22 are spaced apart so as to be adapted to be received between corresponding link ends 26 of an adjacent chain link in the next row. The link ends 22 and 26 are joined together by a plurality of reach bars 30 (FIG. 4) extending between the link ends 22 and 26, the reach bars 30 extending generally in the direction of the chain pitch, i.e. between the chain pins. More particularly, the reach bars 30 form a generally zig zag pattern with each reach bar 30 extending from an end portion of one of the link ends or barrels 22 to an end portion of a link end 26 of the second set of link ends.

The chain links also include a top plate 34 extending along the width of the chain link 18 and intermediate the link ends 22 and 26 from one edge of the chain link 18 to the other. In the illustrated arrangement, the top plate 34 is a narrow strip extending along the central portion of the chain link from one edge to the other, but in other arrangements it could have a greater width. The top plate 34 is integrally formed with the upper portions of the reach bars 30, and it functions to join the midportions of the reach bars 30 together as well as to provide a smooth surface to support and convey product.

Figure 7:
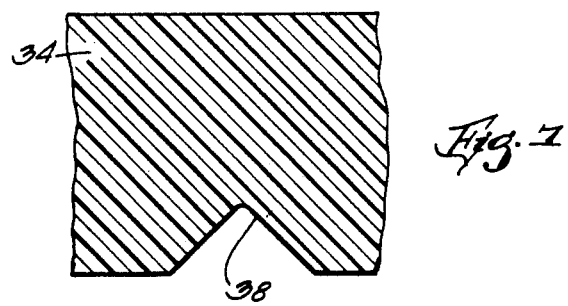
FIG. 7 is a much enlarged partial view of the conveyor chain shown in FIG. 6.

Means are also provided for facilitating breaking of the molded plastic chain link into two or more chain link portions or sections. This means includes a plurality of grooves 38 (FIG. 4) formed in the top plate, the grooves 38 being spaced apart across the width of the chain link 18 at predetermined intervals. The grooves 38 are formed in the bottom surface of the top plate 34 at evenly spaced apart selected locations along the width of the chain link. The grooves 38 extend parallel to the pitch of the chain and in the particular embodiment of the invention illustrated in the drawings, the grooves 38 are intermediate or equidistant the reach bars 30. Additionally, in the specific arrangement illustrated in the drawings and as best shown in FIG. 7 the grooves are generally V-shaped in cross-section and have a depth extending approximately one-fourth of the thickness of the top plate.

The link ends 27 in alignment with the grooves 38 are split or bifurcated so as to include a parting line lying in the plane including the adjacent V-shaped groove, and those bifurcated link ends 27 include opposed generally flat faces 40. These flat faces 40 can form an end surface of a chain link as will be described hereinafter.

Figure 6:
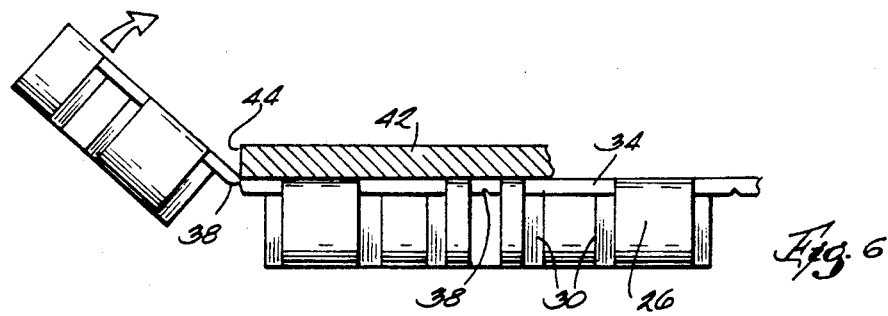
FIG. 6 is a enlarged end view of the molded chain link illustrated in FIG. 3 being broken into two chain links.

FIG. 6 illustrates a method for breaking the chain link 18 along one of the grooves to form two chain links of reduced width. As illustrated in FIG. 6, the chain link 18 can be bent sharply about a line including the selected groove 38 and such that the angle defined by the upper surface of the top plate 34 is less than 180°. As illustrated in FIG. 6, and merely for purposes of example, the top surface of a portion of the chain link can be placed against a metal form or plate 42, with the groove 38 aligned with the end 44 of the metal form 42. The end of the chain link not supported against the form can be forced upwardly to break off that portion of the chain link along the line defined by the groove 38.

In a preferred form of the invention, the molded plastic link 18 can be comprised of material such as polypropylene or acetal. In such a molded plastic link, the chain link will break off along a plane including the bottom of the groove if the link is bent quickly to an angle of approximately 45°. When the link 18 is broken, the opposed ends of the top plate will form a relatively planar smooth surface with almost no burrs or projecting material. Accordingly, normally no machining or deburring is required.

The conveyor chain 12 shown in FIG. 1 is comprised of multiple rows of molded plastic chain links 18 broken off to have varying lengths, as will be described hereinafter, and with the chain links 18 in adjacent rows bricklayed together and with the rows of chain links 18 joined by hinge pins or chain pins 20. In the illustrated configuration, the row 50 of chain links is comprised of links 52, 54 and 56 and the adjacent row 60 is comprised of links 62, 64 and 66 with the link ends of the chain links 62, 64 and 66 intermeshing with link ends of more than one of the chain links 52, 54 and 56. The conveyor chain is formed by linking together repeated rows 17 of chain modules in this fashion by the elongated chain pins 20.

Figure 5:
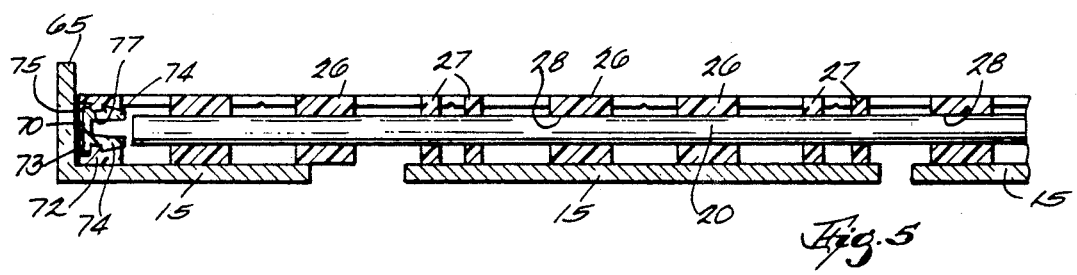
FIG. 5 is a cross section end view of the conveyor and chain shown in FIG. 1.

As shown in FIGS. 1 and 5, the conveyor chain is supported by a conveyor frame 14 including a plurality of frame members or wear strips 15 which are positioned below the chain and support the chain for movement along the length of the conveyor. The conveyor frame also includes rails or wear strips 65 adapted to be positioned adjacent the sides of the conveyor chain 12 and to support the opposite edges of the conveyor chain for movement along the conveyor.

In the specific embodiment of the invention illustrated in the drawings, the chain pins 20 are held in the openings in the link ends by plugs 70 (FIG. 5) provided in end link ends 72 at opposite edges of the conveyor chain, the plugs 70 being inserted into the holes 74 in the end link ends 72, the plugs 70 having resilient legs 74 which engage the inward surface or inner surface of the end link ends. More particularly, the plugs 70 include a head 73 having an outer surface 75 which is adapted to be flush with the edge of the chain link and a pair of spaced apart resilient legs 74 which project from the head 73 and which are adapted to extend through the hole 77 in the outer link end 72. The legs 74 each include a shoulder and the legs spring outwardly once the legs are forced through the hole 77 in outer link end until the shoulders of the legs 74 engage the inner surface of the end link end.

When the chain is driven and is under tension in the conveyor, the reach bars 30 transmit tensile loads between the link ends 22 and 26 and to the chain pins 20. The top plate 34 provides strength to the chain in the lateral direction and the wear strips or conveyor frame members 15 placed beneath the chain 12 prevent bending or deflection of the chain as a result of loads being placed on the chain. The chain links 18 can withstand substantial bending or deflection, and during use in a conveyor, will not break along the lines of the grooves 38 because of support provided by the wearstrips 15 of this conveyor frame 14.

In the event a load is dropped onto the conveyor or some other occurrence causes breakage of the chain along the groove 38, because the chain links 18 are bricked with the chain links in adjacent rows 17, the chain links 18 cannot separate laterally and the strength of the conveyor chain is not significantly affected.

In the specific embodiment of the invention shown in the drawings, the molded chain link 18 shown in FIG. 2 has a length of 12" and the chain pitch is approximately 1". The grooves 38 molded into the bottom surface of the top plate 34 are spaced apart at 1" intervals such that the molded link 18 can be broken at any one of the grooves 38 to form links having widths which are any multiple of 1 inch.

As best illustrated in FIG. 4, each individual component of the chain link between the groove's includes three reach bars 30 joining two pairs of link ends 22 and 26, each pair of link ends including one barrel and one bifurcated link end 27. As will be appreciated by those skilled in the art the molded chain links have a construction such that the links can be end-to-end reversible.

Figure 11:
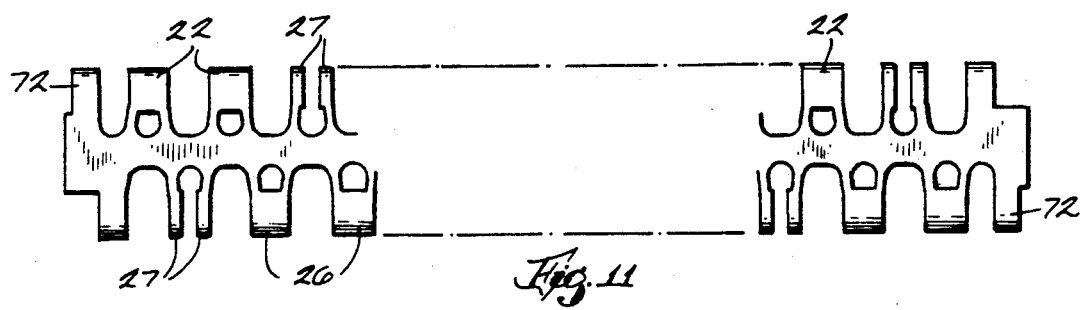
FIG. 11 is a view similar to FIG. 3 and showing another chain link having a configuration embodying the invention.

In one embodiment of the invention, conveyor chains can be formed having substantially any width of one inch increments and can be made from only three different chain links, one being 12 inches long and having a construction as illustrated in FIG. 3, a second chain link being 13 inches long and having a construction as shown in FIG. 11, and a third chain link being 12 inches long but not having link ends 72 at the edges of the module adapted to house the plugs 70. These chain links can be broken such that they can be used to assemble conveyor chains of substantially any width and with the formation of a minimum of scrap.

FIG. 8 illustrates in exploded relation a conveyor chain embodying the invention, having a 12 inch width and formed from such molded chain links. One row 50 of the chain links are formed from a 2 inch left hand segment 52 of a 12 inch module, a 6 inch center portion 54 of a 12 inch module and a 4 inch right segment 56 of a 12 inch module. The next row 60 can be formed of a 4 inch left segment 62 of the module, a 6 inch center portion 64 of the module and a 2 inch right hand end segment 66 of the 12 inch module. In FIG. 8 the various chain links are shown in partially exploded relation for purposes of illustrating the bricked assembly of the chain.

Illustrated in FIG. 9 is another embodiment of the invention and showing a 15 inch width chain formed from chain links all broken off of 12 inch and 13 inch modules shown in FIGS. 3 and 11, respectively. The row 80 is formed from a 5 inch left end segment 82 of a 13 inch module, an 8 inch center portion 84 of a 12 inch or 13 inch module and a 2 inch right end segment 86 of a 13 inch module. The adjacent row can be formed of a 2 inch left end segment 92 of a 12 inch or 13 inch module, an 8 inch center section 94 of a 12 inch or 13 inch module and a 5 inch right end segment 96 portion of a 13 inch module.

FIG. 10 illustrates another alternative arrangement and wherein an 18 inch wide conveyor is made up of assembled portions of 12 inch wide modules illustrated in FIG. 2. In this illustrated arrangement one row 100 can be formed of a 2 inch left end segment 102 of a 12 inch chain link, a 12 inch center section 104 molded so as to have no plugged link ends and a 4 inch right end section 106 of a 12 inch chain link. The adjacent row 110 is formed from a 4 inch left end section 112 of a 12 inch chain link, a 12 inch center section 114 and a 2 inch right end section 116 of a 12 inch chain link.

In one embodiment of the invention chains having any widths in increments of 1 inch can be formed from two molded links, one of the links having a construction substantially as illustrated in FIG. 2 but having a width of 6 inches and including opposite ends adapted to house plugs, and the other link being 12 inches in length but having no plugged link ends. These two molded links can be broken and assembled to form conveyor chains of any width with only minimal waste or scrap of two and four inch right and left hand modules are made by breaking the molded 6 inch module. Center span portions or center sections of the rows of modules can be made from the 12 inch molded chain links.

In another embodiment of the invention the conveyor chain can be formed from a 6 inch module and 12 inch module as described above and further in combination with a module 7 inches long and having a configuration as shown in FIG. 11 but being only 7 inches long. In such an arrangement, for chains which are formed with an even number width, two inch and four inch end modules are made by breaking the 6 inch modules into two pieces, and the center sections of the rows of modules are formed, the 12 inch center sections and by breaking the 12 inch center sections into appropriate lengths. For chains formed with an odd number width, two inch and five inch end modules are formed by breaking the 7 inch molded link and the center sections can be made up of broken and unbroken 12 inch center modules. For example a 24 inch conveyor can be formed by breaking the 12 inch molded chain link so as to produce a 2 inch left section and a 4 inch section from the opposite end. The center portions of the conveyor chain can be formed from the remaining 6 inch center section of that chain link and another 12 inch section. The next row of the conveyor chain can be formed from a 4 inch left section of the 12 inch molded link, a 2 inch right end section from that 12 inch link, with the center portion of that row formed of the remaining 6 inch section of that molded link and another 12 inch molded link.

Various features of the invention are set forth in the following claims.

We claim:

1. A conveyor chain comprising a plurality of molded plastic chain links assembled in brick-laid fashion, the molded plastic chain links each comprising:
   a first plurality of spaced apart link ends including aligned bores adapted to house a first chain pin, the aligned bores defining a central first chain pin axis;
   a second plurality of spaced apart link ends including aligned bores adapted to house a second chain pin the aligned bores of the second link ends designing a central second chain pin axis, a chain pitch being defined by a line perpendicular to and intersecting the first chain pin axis and the second chain pin axis;
   an intermediate structure connecting the first plurality of link ends to the second plurality of link ends, the intermediate structure including means for facilitating breaking of the molded plastic chain link at selected locations along the length of the chain link and such that the molded plastic chain link is broken along a line extending in the direction of the chain pitch at each such selected location.

2. A conveyor chain as set forth in claim 1 wherein the means for facilitating breaking of the molded plastic chain link includes a plurality of spaced apart linear grooves formed in the intermediate structure and extending in the direction of the chain pitch, the grooves each providing a break point whereby the chain link may be broken along a line extending in the direction of the chain pitch.

3. A conveyor chain as set forth in claim 1 wherein the intermediate structure includes a plurality of reach bars extending generally in the direction of the chain pitch, the reach bars connecting the first link ends to the second link ends, and a top plate having a upper surface and a lower surface, and wherein the means for facilitating breaking of the molded plastic chain link includes at least one groove formed in the top plate and extending in the direction of the chain pitch.

4. A conveyor chain as set forth in claim 3 wherein at least one groove is formed in the lower surface of the top plate and intermediate a pair of said reach bars.

5. A conveyor chain as set forth in claim 4 and wherein the means for facilitating breaking of the molded plastic chain link includes a plurality of grooves formed in the lower surface of the top plate and spaced apart along the width of the module, each of the plurality of grooves extending in the direction of the chain pitch.

6. A conveyor chain as set forth in claim 5 wherein the grooves are each generally V-shaped in cross section perpendicular the direction of the grooves, and wherein the grooves are formed in the lower surface of the top plate.

7. A conveyor chain as set forth in claim 3 wherein the chain links each further include at least one link end in line with said at least one groove, said link end being bifurcated and including a parting line in the plane including said at least one groove.

8. A conveyor chain as set forth in claim 7 wherein a plurality of grooves are spaced apart along the length of the chain and wherein the first set of link ends includes a plurality of bifurcated link ends the bifurcated link ends of the first set of link ends being separated by two solid link ends.

9. A conveyor chain as set forth in claim 8 wherein the grooves are spaced apart such that between each pair of grooves the first set of link ends includes one solid link end and one portion of a bifurcated link end.

10. A molded plastic chain link for use in forming a conveyor chain, the molded plastic chain link being adapted to be assembled in bricked relation with other like molded plastic chain links in forming a conveyor chain, the molded plastic chain link comprising:
   a first plurality of spaced apart link ends including aligned bores adapted to house a first chain pin;
   a second plurality of spaced apart link ends including aligned bores adapted to house a second chain pin;
   an intermediate structure connecting the first plurality of link ends to the second plurality of link ends, the intermediate structure including means for facilitating breaking of the molded plastic chain link at a plurality of selected locations along the length of the chain link and such that the molded plastic chain link is broken along a line extending in the direction of the chain pitch at each such selected location.

11. A molded plastic chain link as set forth in claim 10 wherein the means for facilitating breaking of the molded plastic chain link includes a plurality of spaced apart linear grooves formed in the intermediate structure and extending in the direction of the chain pitch, the grooves each providing a break point whereby the molded plastic chain link may be broken along a line extending in the direction of the chain pitch.

12. A molded plastic chain link as set forth in claim 10 wherein the intermediate structure includes a plurality of reach bars extending generally in the direction of the chain pitch, the reach bars connecting the first link ends to the second link ends, and a top plate having a top surface and a lower surface, and wherein the means for facilitating breaking of the molded plastic chain link includes at least one groove formed in the top plate and extending in the direction of the chain pitch.

13. A molded plastic chain link as set forth in claim 12 wherein the at least one groove is formed in the lower surface of the top plate and intermediate a pair of reach bars.

14. A molded plastic chain link as set forth in claim 10 and wherein the mean for facilitating breaking of the molded plastic chain link includes a plurality of grooves spaced apart along the width of the module each of the grooves extending in the direction of the chain pitch.

15. A molded plastic chain link as set forth in claim 14 wherein the grooves are each generally V-shaped in cross section perpendicular the direction of the grooves, and wherein the grooves are formed in the lower surface of the top plate.

16. A molded plastic chain link as set forth in claim 10 wherein the chain links includes at least one link end in line with one of the grooves said link end being bifurcated and including a parting line in the plane including at least one groove.

17. A molded plastic chain link as set forth in claim 16 wherein the grooves are spaced apart along the length of the chain such that the bifurcated link ends of the first set of link ends are separated by two solid link ends.

18. A molded plastic chain link as set forth in claim 10 wherein the grooves are spaced apart such that between each pair of grooves the first set of link ends includes one solid link end and one portion of a bifurcated link end.

* * * * *